United States Patent
Nazikkol et al.

(10) Patent No.: US 6,656,305 B1
(45) Date of Patent: Dec. 2, 2003

(54) METHOD FOR PRODUCING A STOVE-ENAMELED MOLDED COMPONENT

(75) Inventors: Cetin Nazikkol, Duisburg (DE); Edgar Panek, Oberhausen (DE); Friedrich Behr, Krefeld (DE)

(73) Assignee: Thyssen Krupp Stahl AG, Dusseldorf (DE)

( * ) Notice: Subject to any disclaimer, the term of this patent is extended or adjusted under 35 U.S.C. 154(b) by 0 days.

(21) Appl. No.: 09/786,019

(22) PCT Filed: Sep. 16, 1999

(86) PCT No.: PCT/EP99/06846

§ 371 (c)(1),
(2), (4) Date: Feb. 28, 2001

(87) PCT Pub. No.: WO00/21747

PCT Pub. Date: Apr. 20, 2000

(30) Foreign Application Priority Data

Oct. 9, 1998 (DE) .......................................... 198 46 533

(51) Int. Cl.$^7$ ................................................. B32B 7/02
(52) U.S. Cl. .................... 156/221; 156/292; 156/307.7; 156/330; 428/416
(58) Field of Search ................................ 156/292, 330, 156/222, 221, 307.7; 428/416

(56) References Cited

U.S. PATENT DOCUMENTS 4,313,996 A * 2/1982 Newman et al. ............ 156/199
4,594,292 A 6/1986 Nagai et al.
5,030,488 A 7/1991 Sobolev

FOREIGN PATENT DOCUMENTS

| DE | 1 920 545 | 11/1969 |
|---|---|---|
| DE | 195 23 498 A1 | 1/1996 |
| EP | 0 297 396 A2 | 1/1989 |
| EP | 0 598 428 A1 | 5/1994 |

* cited by examiner

Primary Examiner—Michael W. Ball
Assistant Examiner—Barbara J. Musser
(74) Attorney, Agent, or Firm—Proskauer Rose LLP

(57) ABSTRACT

The invention relates to a process for producing an enamel baked molded component made from a double-layer plate comprising two cover plates with an intermediate epoxy resin layer that is glued to the cover plates. The process comprises introducing the epoxy resin between the cover plates prior to its polymerization to maintain an adhesive connection between the cover plates and the intermediate layer, while at the same time allowing for deformation of the double-layer plate by deep-drawing in particular without subjecting the cover plates to excessive stress. The epoxy resin that is used polymerized exclusively at the enamel baking temperatures, being coherent but not polymerized when the double-layer plate is deformed, while the enamel layer is baked only after the deformed component is lacquered, whereby said baking occurs at a temperature at which polymerization of the epoxy resin of the intermediate layer also occurs.

19 Claims, 1 Drawing Sheet

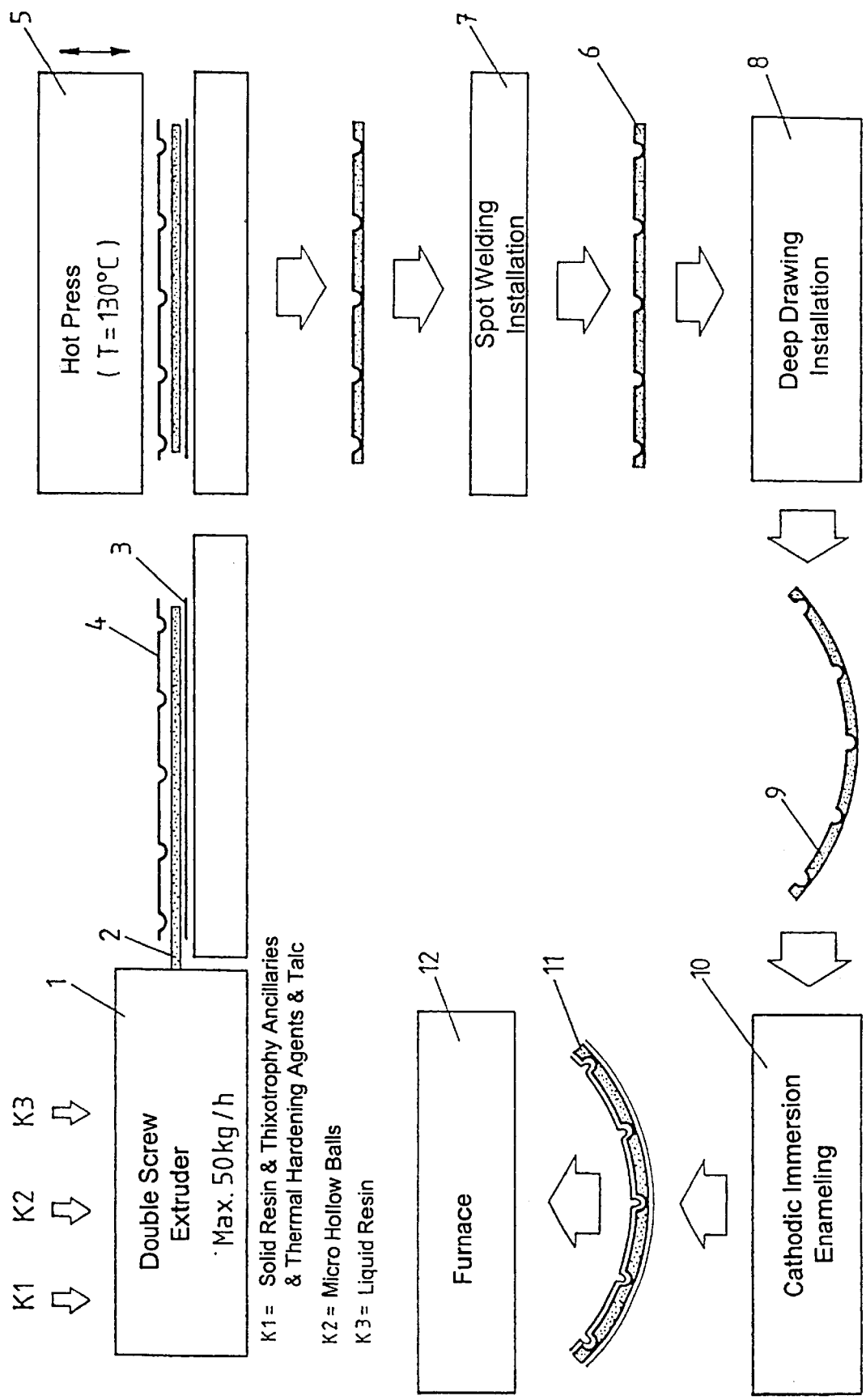

METHOD FOR PRODUCING A STOVE-ENAMELED MOLDED COMPONENT

The invention relates to a process for the production of a stove-enameled moulded component from a double-layer plate having an intermediate layer of an epoxy resin in the form of a hot melt glued to its cover plates.

Such moulded components used, for example, in motor vehicle body construction, must have as low a weight per unit area as possible, accompanied by high buckling resistance. The double-layer plate must also be satisfactorily shapeable, more particularly be satisfactorily deep-drawable. Lastly, the moulded component must cause no problems during enameling, more particularly cathodic immersion enameling or in the subsequent stoving of the enamel.

The problem is known from U.S. Pat. No. 4,594,292 A1 that in a double-layer plate with a resin intermediate layer, glued to the cover plates, the adhesive connection between the intermediate layer and the cover plates is cancelled out by loosening with heavy deformations. To prevent this undesirable event while at the same time ensuring that during shaping the intermediate layer does not press so heavily against the cover plates that their outer zones become cracked, the intermediate layer consists of three different resin layers each having different properties. The core layer behaves plastically, while the outer layers consist of a ductile resin which does not flow under the shaping loadings occurring and therefore does not press against the cover plates of the double-layer plate. In this way extreme deformations with bending by up to 180° are supposed to be achieved without the intermediate layer becoming loosened from the cover plate and/or cracking taking place in the cover plates.

However, moulded components produced from such a double-layer plates are unsuitable for stove enameling, since the outer layers of the intermediate layer consist of a mixture of polyethylene and polypropylene—i.e., thermoplastics which become liquid at temperatures above 160° C. During the stoving of the enamel during stoving enameling, which is typically carried out at temperatures of 180° C. and above for a minimum duration of 30 minutes, the intermediate layer would partially run out, and the adhesive connection between the cover plates and the intermediate layer, important for the buckling resistance of the moulded component, would be lost.

A double-layer plate is also known (EP 0 598 428 A1) in which an intermediate layer of polypropylene is glued by adhesive to the cover plates. Such a double-layer is supposed to be suitable for cold shaping to give a moulded component, which is supposed to have high dimensional stability after heat treatment at least 135° C. Since polypropylene is a thermoplastic which becomes liquid at temperatures above 160° C., the same thing applies to such a component as to the previously-mentioned one, namely that the adhesive connection between the cover plates and the intermediate layer is lost with the treatment time of 30 minutes at a minimum temperature of 180° C., as is customary in enamel stoving.

It is an object of the invention to provide a process for the production of a stove-enameled moulded component from a double-layer plate having an intermediate layer of epoxy resin in the form of a hot melt which is glued to its cover plates.

It is also an object of the invention to provide a double-layer plate which is both deep-drawable and also suitable for stove-enameling. More particularly the double-layer plate is suitable for a production process according to the invention of stove-enameled moulded component.

This problem is solved by the following process steps:

a) after the introduction of the intermediate layer of an epoxy resin, which polymerises (cross-links) only at enamel stoving temperatures above 180° C., between the cover plates and the spatial fixing of the cover plates in relation to one another, the double-layer plate is transformed into the shape of the component with the epoxy resin coherent but not yet polymerised (cross-linked), b) after the shaped component has been enameled, the enamel is stoved at a temperature at which also the polymerisation (cross-linkage) of the epoxy resin takes place simultaneously.

In the process according to the invention, the selection of a particular epoxy resin in a particular state ensures that during the shaping of the double-layer plate to give the moulded component, more particularly by deep-drawing, since the epoxy resin is not yet cross-linked the intermediate layer shares in the deformations, and the cover plates are not impermissibly heavily loaded and/or the cover plates do not become loosened from the intermediate layer. This at the same time ensures that due to its solid state during shaping, the material of the intermediate layer is not forced out between the cover plates. It also makes sure that the epoxy resin does not melt and run out at the conventional higher, more prolonged temperatures of stoving, but polymerises, so that the final firm adhesion of the cover plates to the intermediate layer only then takes place, and after the cooling of the epoxy resin the shaped component acquires optimum buckling resistance.

A double-layer plate having an intermediate layer of epoxy resin and the following recipe was found to be particularly suitable:

Composition of the bonding agent system (in % by weight):

| Components: | Possible Composition |
|---|---|
| solid epoxy resin | 50–80 |
| thixotrophy ancillaries | 1–10 |
| thermal hardening agents | 1–8 |
| talc | 0–9 |
| wollastonite | 0–10 |
| silanes | 0–10 |
| resin-wettable fibre material | 0–10 |
| glass micro hollow balls | 5–45 |
| plastics micro hollow balls | 0–10 |
| liquid epoxy resin | 0–25 |

The additives enable adjustment to be made to the Theological properties of the material of the intermediate layer. For example, this can be achieved by means of a material, such as highly disperse silica, which reduces flow behaviour at elevated temperatures. However, control can also be effectively obtained by the use of micro hollow balls. With these additives, the material of the intermediate layer can be thixotropically adjusted in the temperature range up to 230° C. This ensures that during enamel staving the material of the intermediate layer does not run out between the cover plates.

There is no need for an accelerator, since the material hardens only during the enamel staving. A suitable hardener is, for example, dicyandiamide. Although it is basically possible to use exclusively epoxy resin as the intermediate layer, this would involve very high material costs and a heavy weight of the component. To reduce weight, according to one feature of the invention fillers having a density which is substantially lower than the density of the epoxy resin are admixed to the epoxy resin mixture. Various materials are suitable for this purpose, such as cellulose fibres, wood dust, porous recycling glass, but more particularly micro hollow balls, preferably having a diameter of 10 to 100 μm. Suitable materials which can be used for the micro hollow balls are thermoplastics, duroplastics, ceramic materials or glass. The best results are obtained using glass hollow balls. In this way densities of 0.6 $g/cm^3$ can be obtained in the intermediate layer.

The buckling resistance of the moulded component depends also inter alia on the adhesion of the intermediate layer to the cover plates. This applies both to moulded components made from double-layer plates with flat cover surfaces, and also moulded components consisting of cover plates with a knobbed plate. In the latter case the number of knobs can be reduced in proportion as the adhesion of the intermediate layer to the cover plates increases. To improve adhesion, and adhesion-enhancing material, such as talc, can be admixed to the epoxy resin mixture. Buckling resistance can be further improved by the admixture to the epoxy resin mixture of a cohesive adhesion enhancing material, such as wollastonite. Lastly, at least one corrosion inhibitor is admixed to the epoxy resin mixture to prevent the occurrence of corrosion on the inner side of the inaccessible cover plates.

The intermediate layer can be produced in various ways.

In a first alternative the intermediate layer used is a foil to which the cover plates are glued. Gluing can be performed by means of a primer which is, for example, painted on to the cover plates and which glues the foil to the cover plates under pressure more particularly after the cover plates have been applied. The use of a glued-on foil is above all advantageous if the cover plates used are flat plates. In that case, the glued-on foil also serves for the spatial fixing of the cover plates during further processing.

However, also alternatively the epoxy resin mixture can be extruded as the intermediate layer directly onto a cover plate.

According to another possible feature of the invention the cover plates are glued to the intermediate layer by the heating of the composite formed by the cover plates and the intermediate layer to an epoxy resin melting temperature (approximately 100° C.) lower than the cross-linkage temperature, for example, in a hot press. At the same time, however, as yet no polymerisation (cross-linkage) of the epoxy resin takes place.

If the cover plates used are flat plates, the cover plates are spatially fixed by the intermediate layer glued to the cover plates. However, if a knobbed plate and a flat plate are used, the knobbed plate is fixed to the flat plate by its knobs being welded on with the intermediate layer applied. Preferably welding-on is performed by resistance welding. The intermediate layer, laid or extruded on as a closed foil, is removed in the zone of the knobs, being displaced by electrode pressure. This means that during welding-on, the epoxy resin yields to the pressure. During this, otherwise than with an intermediate layer perforated for the knobs to pass through, advantageously the gap between the cover plates remains filled to its full volume. The removal of epoxy resin from the zone of the knobs is facilitated if pressure and heat are applied simultaneously. Heating can be provided, for example, by a heatable welding table top, via which a flat plate lying thereon and therefore also the intermediate layer are heated.

The invention will now be explained in greater detail with reference to a drawing. The drawing shows diagrammatically the process of production of a stove-enameled moulded compartment, starting from the phase of the production of a double-layer plate.

The following components of a bonding agent system forming an intermediate layer are introduced into a double screw extruder 1; component K1—a mixture of solid resin, thixotrophy ancillaries, chemical hardening agents; component K2—micro hollow balls; and, if required K3—liquid resin. Further components can be added, such as fibrous material, wood dust, wollastonite and silanes, etc. A recipe which has proved its use in practice is shown in the following Table.

Composition of the bonding agent system (in % by weight):

| Components: | Possible Composition |
| --- | --- |
| solid epoxy resin | 50–80 |
| thixotrophy ancillaries | 1–10 |
| thermal hardening agents | 1–8 |
| talc | 0–9 |
| wollastonite | 0–10 |
| silanes | 0–10 |
| resin-wettable fibre material | 0–10 |
| glass micro hollow balls | 5–45 |
| plastics micro hollow balls | 0–10 |
| liquid epoxy resin | 0–25 |

The solid epoxy resin can be modified or unmodified. Preferably it has a bisphenol-A or F base. The same thing applies to the liquid epoxy resin. A suitable chemical hardening agent is dicyandiamide. Highly disperse silica (Aerosil®) has proved a suitable thixotrophy ancillary.

A foil 2, extruded from components K1, K2, K3 is deposited as intermediate layer on a flat plate 3. A knobbed plate 4 is applied from above to the foil 2. From the extruded foil 2, the flat plate 3 and the knobbed plate 4 a double-layer plate is formed, with the extruded foil 2 as intermediate layer and the plates 3 and 4 as cover plates. If both the cover plates 3, 4 take the form of flat plates, for the temporary fixing of the composite the plates 3 and 4 should be provided on their side adjacent the intermediate layer 2 with a primer which, when the composite experiences pressure, results in the cover plates 3, 4 and the intermediate layer 2 being fixed on one another.

Alternatively, the intermediate layer 2 can be applied by means of a calender.

The cover plates 3, 4 are suitably steel plates having a thickness of 0.1 mm to 2.0 mm. The cover plates 3, 4 are preferably galvanised. The intermediate layer 2 preferably has a thickness of 1 mm to 10 mm.

The composite 2, 3, 4, thus prepared for the production of the double-layer plate, is supplied to a hot press 5. With the supply of heat and pressure, the knobbed plate 4 is forced by its knobs into the softened intermediate layer 2. The temperature operative should be at least 100° C., but below the temperature leading to a polymerisation of the epoxy resin of the intermediate layer 2. At such a temperature the epoxy resin is displaced in the zone of the knobs, so that the total volume between the cover plates is filled. The knobs act as spacing elements. The cover plates forced on to one another by pressing contact at the end faces of the knobs, so that the two cover plates 3, 4 can be welded to the end faces of the knobs in a following spot welding installation 7. In addition to the fixation of the cover plates 3, 4 via the adhesive connection between the intermediate layer 2 and the cover plates 3, 4, the welded connection produces an additional fixation of the two cover plates 3, 4 to one another.

After any necessary cutting to size, the resulting double-layer plate 6 is conveyed to a deep drawing installation 8. The double-layer plate 6 can be shaped into the required moulded component without problems—i.e., without the adhesive connection between the intermediate layer 2 and the cover plates 3, 4 becoming loosened or the cover plates 3, 4 becoming overstressed, since the not yet polymerised epoxy resin of the intermediate layer 2 shares in such deformations. Nor is the intermediate layer 2 squeezed out over the edges of the cover plates 3, 4.

After it has been incorporated as a rule in vehicle bodywork, the resulting moulded component 9 is supplied to a cathodic immersion enameling installation 10. The immersion-enameled moulded component 11 is then treated in a furnace 12 at a minimum temperature of 180° C. for at least 30 minutes. However, higher temperatures with shorter treatment times are also possible. The enamel is stoved, and at the same time the epoxy resin of the intermediate layer 2 polymerises. The epoxy resin survives without problems this high temperature and the relatively prolonged treatment, but also even a more prolonged treatment. More particularly, the intermediate layer does not become loosened from the cover plates, nor does the epoxy resin flow out. After cooling, the moulded component has the required high buckling resistance, accompanied by a low weight per unit of area.

Experience shows that the recipe of the intermediate layer also survives without damage any disturbance during stove-enameling if, for example, the component is subjected in the furnace to a temperature of 230° C. for a period of up to ten minutes, substantially exceeding the stoving time.

What is claimed is:

1. A process for producing a molded component from a double-layer plate having cover plates and an intermediate layer of an epoxy resin, wherein the cover plates have an inner surface and an outer surface and wherein said epoxy resin forms a hot melt glue adhered to the inner surface of the cover plates comprising:
    a) introducing said epoxy resin prior to its polymerization between said inner surface of the cover plates, said epoxy resin polymerizing only at an enamel baking temperature; and
    spatially fixing said cover plates in relation to one another;
    b) molding said double-layer plate into a desired shape for said molded component;
    c) applying an enameled covering to the outer surfaces of said cover plates;
    d) baking said double layer-plate at an enamel baking temperature, whereby said enamel covering is baked and said epoxy resin is polymerized simultaneously;
    e) wherein the cover plates comprise a knobbed plate and a flat plate, and wherein the knobbed plate is welded by its knobs to the flat plate.

2. A process according to claim 1, comprising an epoxy resin mixture of solid and liquid resin with a ratio of 100:20 to 100:10 and a hardener.

3. A process according to claim 2, comprising admixing a mixture material to the epoxy resin, wherein said mixture material reduces flow behavior of the epoxy resin at elevated temperatures prior to polymerization.

4. A process according to claim 3, wherein the mixture material is highly dispersed silica.

5. A process according to claim 1 comprising admixing an adhesion-enhancing material to the epoxy resin.

6. A process according to claim 5, wherein the adhesion enhancing material is talc.

7. A process according to claim 1, comprising admixing fillers to the epoxy resin, said fillers having a density which is lower than the density of the epoxy resin.

8. A process according to claim 7, wherein the fillers are micro hollow balls.

9. A process according to claim 1, comprising admixing to the epoxy resin a material which enhances cohesive adhesion of the epoxy resin to the cover plates.

10. A process according to claim 9, wherein the material is wollastonite.

11. A process according to claim 1 comprising admixing at least one corrosion inhibitor to the epoxy resin.

12. A process according to claim 1, wherein the intermediate layer used is a foil of epoxy resin to which the cover plates are glued.

13. A process according to claim 1 comprising extruding the epoxy resin as the intermediate layer directly on to one of the cover plates.

14. A process according to claim 1, comprising: gluing the cover plates to the intermediate layer by heating the double-layer plate formed by the cover plates and the intermediate layer to an epoxy resin melting temperature lower than cross-linkage temperature.

15. A process according to claim 1 comprising performing welding-on by resistance welding.

16. A process according to claim 1 comprising applying the knobbed plate with simultaneous use of pressure and heat.

17. A process according to claim 1, comprising: heating a heatable welding table; and
    placing the flat plate on the heatable welding table during the welding of the knobbed plate to the flat plate so that heat is conveyed from the welding table into the intermediate layer via the flat plate.

18. A deep-drawable double-layer plate made according to claim 1 wherein the epoxy resin comprises (in % by weight):

| Components | Possible Composition |
| --- | --- |
| Solid Epoxy Resin | 50–80 |
| Thixotrophy Ancillaries | 1–10 |
| Thermal Hardening Agents | 1–8 |
| Talc | 0–9 |
| Wollastonite | 0–10 |
| Silanes | 0–10 |
| Resin-Wettable Fibre Material | 0–10 |
| Glass Micro Hollow Balls | 5–45 |
| Plastics Micro Hollow Balls | 0–10 |
| Liquid Epoxy Resin | 0–25 |

19. A double-layer plate according to claim 18, wherein the knobs are welded by knobs tips to the flat cover plate which are located exclusively at the outer edge of the knobbed plate whose remaining surface is flat.

* * * * *